Oct. 22, 1968   F. R. BECKER III   3,406,627
TAG FEEDING DEVICE

Filed April 4, 1966   6 Sheets-Sheet 1

Fig.1

INVENTOR
FREDERICK R. BECKER, III

BY *Marion P. Lelong*

AGENT

Oct. 22, 1968  F. R. BECKER III  3,406,627
TAG FEEDING DEVICE
Filed April 4, 1966  6 Sheets-Sheet 2

INVENTOR

FREDERICK R. BECKER, III

BY *Marion P. Lelong*

AGENT

Oct. 22, 1968  F. R. BECKER III  3,406,627
TAG FEEDING DEVICE

Filed April 4, 1966  6 Sheets-Sheet 5

INVENTOR
FREDERICK R. BECKER, III

BY *Marion P. Lelong*
AGENT

Oct. 22, 1968  F. R. BECKER III  3,406,627
TAG FEEDING DEVICE
Filed April 4, 1966  6 Sheets-Sheet 6

INVENTOR
FREDERICK R. BECKER, III

BY
AGENT

United States Patent Office 3,406,627
Patented Oct. 22, 1968

3,406,627
TAG FEEDING DEVICE
Frederick R. Becker III, New Orleans, La., assignor to West Virginia Pulp and Paper Company, New York, N.Y., a corporation of Delaware
Filed Apr. 4, 1966, Ser. No. 539,896
10 Claims. (Cl. 101—232)

This invention relates to dispensing devices for sheet materials and particularly relates to devices for selectively dispensing a single flexible tag from a stack of flexible tags and simultaneously printing thereon.

The object of this invention is to provide a device for selectively dispensing single tags in response to a demand signal.

Another object is to provide means for printing information on each tag as it is selectively dispensed.

The invention is a tag feeder that is capable for selectively dispensing a single tag. It is customarily used with a tag conveying means, such as a timing belt that is paralleled by a smooth and closely adjacent plate, which typically conveys each tag separately to a bag on an assembly line. The tag feeder has a roll section and a tag storage section. A printing device is preferably installed in the roll section so that an identifying legend can be printed upon each tag as it is dispensed.

The tag storage section of the tag feeder has a flat boundary means, generally in the form of a rigid front boundary wall, against which the long side of a stack of tags, herein identified as the forward side, is aligned. The other long side is herein identified as the rearward side of the tag stack. Rigidly attached to one edge of the flat boundary means is a curved boundary means, in a form of a curved discharge plate, having linear elements that are parallel to the plane of the flat boundary means.

At right angles to the flat boundary means are tag support means that may simply comprise a pair of tag supports which are mutually separated by less than the length of a tag. In the embodiments shown in the drawings, the tag support means are in the form of a U-shaped tag base plate. On the side of the tag base plate adjacent to the curved discharge plate, there is a roll opening that has less width than the length of a tag. The portions of the tag base plate on either side of this roll opening support the end of a tag stack and curvingly extend into a spaced-apart convergence with the curved discharge plate, thereby defining a discharge slot therebetween that projects diagonally away from the face of the tag stack contacting the tag base plate.

Pressure-applying means, in the form of a rigidly aligned tag advance plate controlled by an air cylinder that are attached to the rigid front boundary wall or other supporting structures, press upon the opposite face of the tag stack, thereby holding the tag stack against the tag base plate with a selected constant pressure. The tag that is adjacent to the base plate is identified as the bottom tag, although the tag feeder may be operated in any position. The bottom tag is urged sideways toward, into, and through the discharge slot by pickup rolls having stepped surfaces.

The roll section has a two-stage tag selection means comprising at least one compression roll that initially compresses the stack of tags on its rearward side, thus loosening the stack of tags on its forward side, and at least one discharge roll that secondarily compresses the stack of tags on its forward side at the same time as, or slightly after, the forward edge of the tag strikes the curved discharge plate on the far side of the discharge slot.

The tag feeder is hereinafter described with reference to the drawings wherein the same reference numbers are used to designated identical parts. FIGURES 1–11 show the tag feeder without a printing device. FIGURES 12–15 show the tag feeder and printing device in combination.

FIGURE 8 represents a stress analysis of FIGURE 2.

Figure 1:
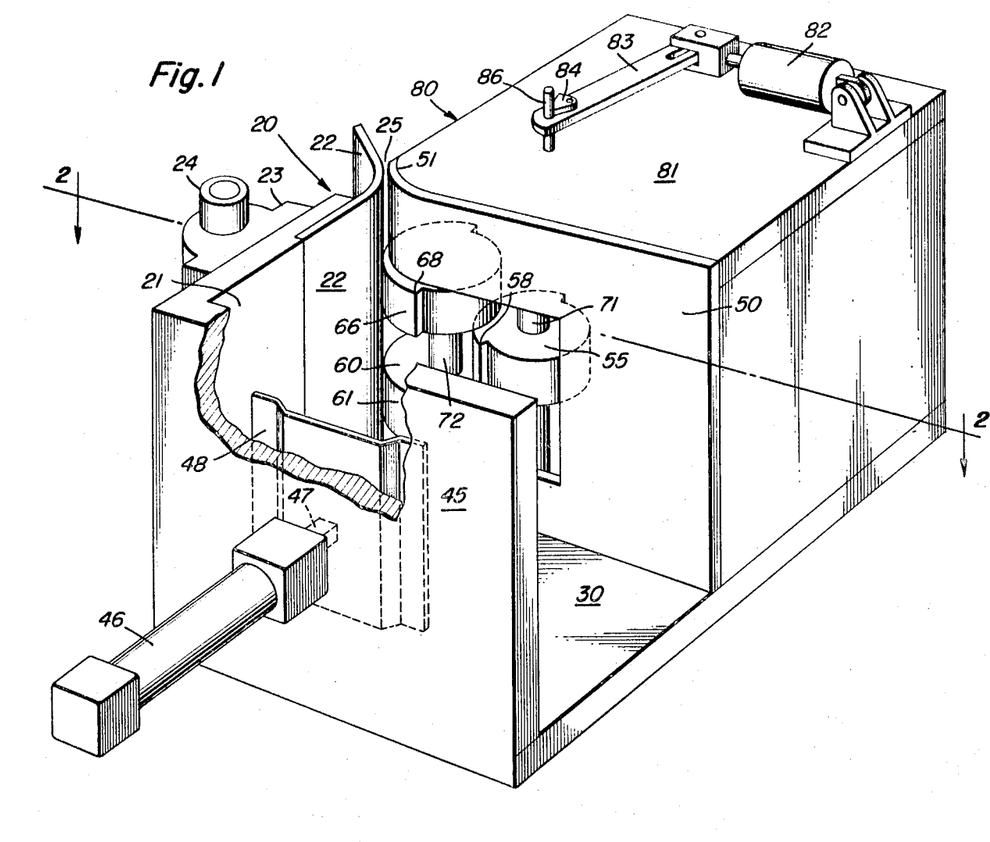
FIGURE 1 is a perspective view of the empty tag feeder without printing rolls, in which compression and discharge rolls are visible through the roll opening in the tag base plate.

In the embodiment shown in FIGURE 1, the partially open tag storage section 20 is a box-like chamber having two adjacent open sides, the load side and the back side, and four closed sides, the front side and the stiffener side, which are adjacent, and the pressure wall and the tag base plate, which are opposite to each other. The front side comprises a rigid front boundary wall 21 and an outwardly curved discharge plate 22 which is rigidly attached thereto to form a flush interior surface. A stack of tags 35 is stored with one long side against plate 22 and supporting wall 21. On the outside of front boundary wall 21, a support bracket 23 is rigidly attached. Adjustably inserted into this support bracket 23 is a support pipe 24.

Figure 6:
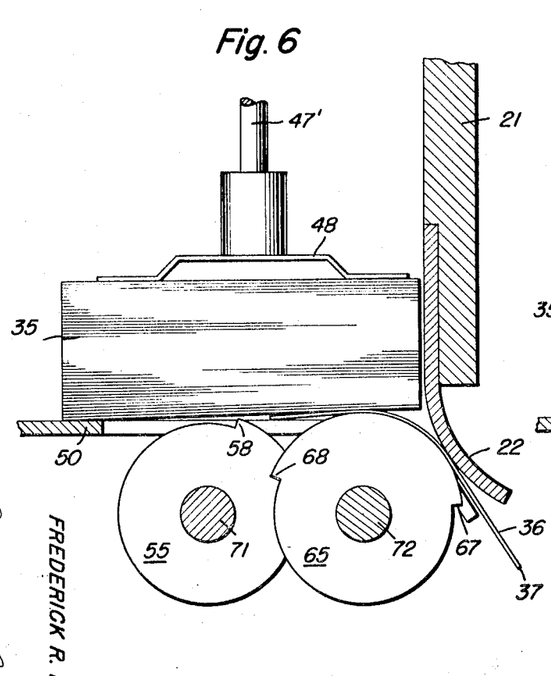
FIGURE 6 shows the entire stack of tags in the same view as FIGURE 5 except that the forward side of the bottom tag protrudes from the discharge slot.
Figure 7:
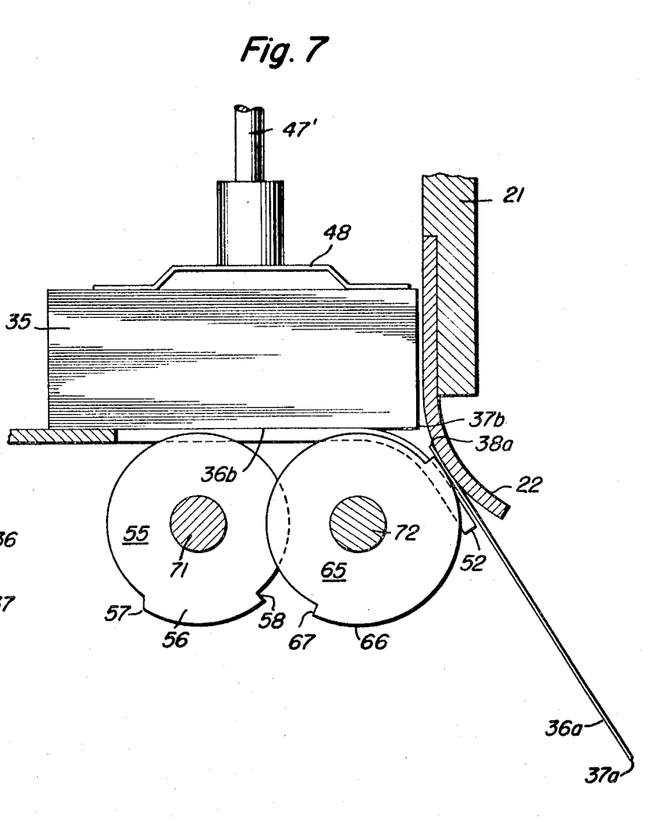
FIGURE 7 is the same view as FIGURE 6 except that the bottom tag has almost completely emerged from the discharge slot.

Opposite to the open load side and at right angles to front boundary wall 21 is the closed stiffener side, formed of a stiffener wall 30 that is a common wall for the tag storage section 20 and the closed roll section 80. At right angles to front wall 21 and stiffener wall 30 is the rigid pressure wall 45 through which piston 47 slideably passes. Piston 47 is attached at one end to tag advance cylinder 46 and is rigidly attached at its other end to tag advance plate 48, whereby a constant pressure, as determined by air pressure inside cylinder 46, can be maintained upon tag stack 35, as indicated in FIGURES 6 and 7.

Figure 12:
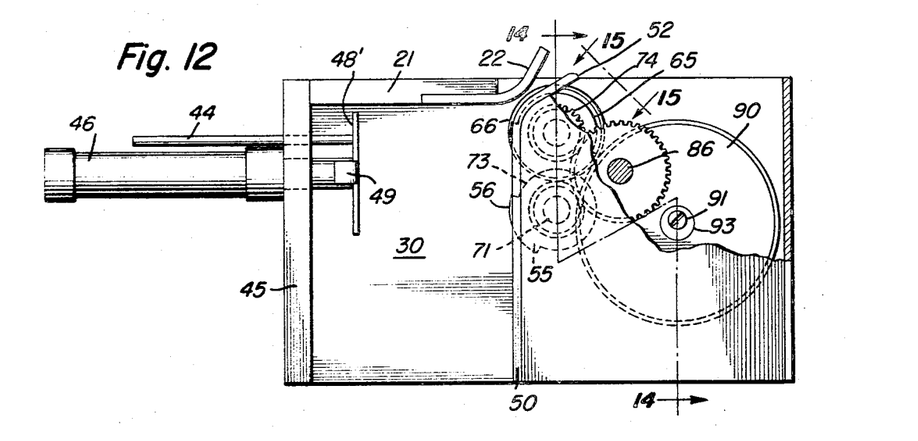
FIGURE 12 shows the empty tag feeder with a section view from its load side that omits the motor, looking in the direction of the arrows crossing the lines 12—12 in FIGURE 13. This view shows the printing rolls, partially in phantom view and partially by breaking away an enclosing wall of the roll section.
Figure 13:
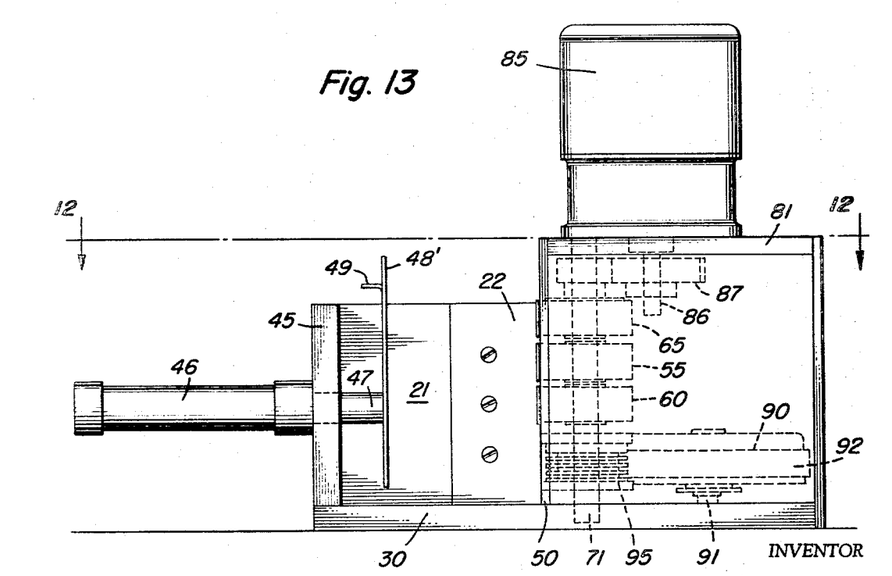
FIGURE 13 shows the tag feeder from its back side with the printing rolls shown in phantom views.
Figures 14, 15:
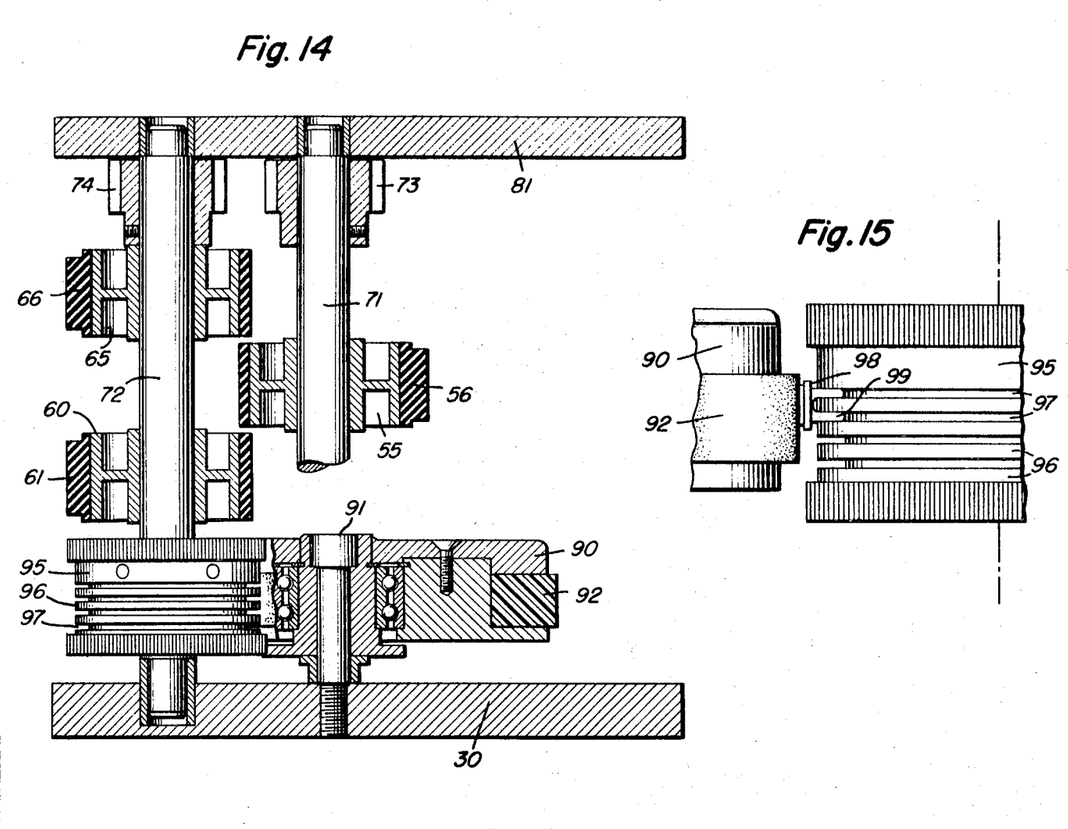
FIGURE 14 is a sectional view looking in the direction of the arrows crossing the lines 14—14 in FIGURE 12.
FIGURE 15 is a sectional view looking in the direction of the arrows crossing the lines 15—15 in FIGURE 12.

If piston 47' is round in cross section, a position guide 44 must be used to prevent rotation of tag advance plate 48', as shown in FIGURE 12. Plate 48 can be shaped to deliver pressure along the long sides of tag stack 35, as indicated in FIGURE 1. As an alternative, a flat plate 48', having a finger grip 49 and a convenient hand extension in the direction of the load side as shown in FIGURE 13, can be used.

This tag stack 35 is supported by tag base plate 50 which forms a partially closed side of roll section 80 and tag storage section 20, opposite to pressure wall 45, and is aligned perpendicularly to front boundary wall 21. Tag base plate 50 is slightly beyond the beginning of curvature of curved discharge plate 22. A central portion of tag base plate 50, adjacent to the curved discharge plate 22, has been removed to create a roll opening 52, leaving slide rails 51 on each side thereof. Each slide rail 51 supports an end of tag stack 35. Slide rails 51 curve into parallelism with discharge plate 22, thereby forming discharge slot 25 therebetween, and remain substantially parallel to the outer surfaces of the nearby discharge rolls 60, 65.

Bottom tag 36 slides sidewise over slide rails 51 toward discharge slot 25, as shown with clarity in FIGURES 2-7. If a printing device is used, the slide rail 51 adjacent to wall 30 is removed, because printing roll 95 can effectively support an end of bottom tag 36. The curved extension of slide rails 51 can also be omitted entirely, for discharge rolls 60, 65 have protruding steps 61, 66 that curve into circular convergence with the outwardly curved discharge plate 22 while maintaining a spaced-apart relationship that serves to define discharge slot 25 therebetween.

The roll section has stiffener wall 30 as one side thereof and motor wall 81 as the opposite side. Walls 30 and 81 contain shaft inserts for rotatable support of compression roll shaft 71 and discharge roll shaft 72.

As can be seen in FIGURE 1, the preferred embodiment of this invention has three pickup rolls 55, 60, 65 that rotate within central roll opening 52. Roll 55 is the initial compression roll; it has a raised sectorial step 56 and is rigidly attached to rotatable compression roll shaft 71.

This compression roll 55 is straddled and partially overlapped by secondary discharge rolls 60, 65 that possess respective raised sectorial steps 61, 66 and are rigidly attached to a common rotatable discharge roll shaft 72. The rolls 55, 60, 65 rotate clockwise as seen in FIGURES 1-7. Their respective raised sectorial steps 56, 61, 66 have leading edges 57, 62, 67 and trailing edges 58, 63, 68. Leading edge 57 is angularly advanced as compared to leading edges 62, 67 of the discharge rolls 60, 65.

Figure 2:
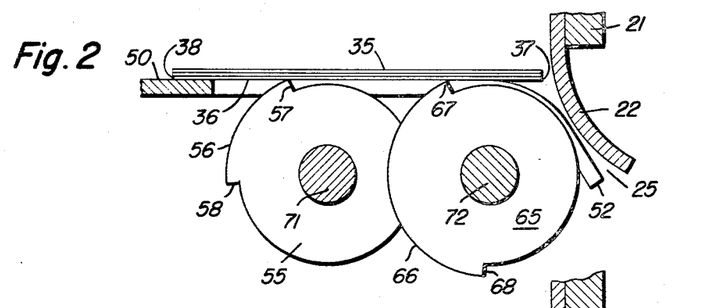
FIGURE 2 is a sectional view, looking in the direction of the arrows across line 2—2 in FIGURE 1, which shows a few tags at the bottom of a stack of tags being pressed against the tag base plate as the compression roll is about to engage the bottom tag.

These rolls 55, 60, 65 are positioned with respect to tag base plate 50 so that only steps 56, 61, 66 protrude beyond the tag-contacting surface of base plate 50. In FIGURE 2, for example, all rolls 55, 60, 65 are entirely recessed with respect to the tag-contacting surface of base plate 50, but in FIGURES 4 and 5, the raised sectorial steps 56, 61, 66 project beyond this surface of base plate 50. A projection of one-fourth of an inch is generally satisfactory, but a smaller projection, such as one-eighth of an inch, is preferable. The surfaces of sectorial steps 56, 61, 66 should be of a fairly stiff material having a high coefficient of friction, such as rubber of 45 to 65 Shore A hardness.

The action of rolls 55, 60, 65 upon a bottom tag 36 of a tag stack 35 is shown in detail in the sectional side elevation views, FIGURES 2-7, and in the perspective views, FIGURES 8-11. As rolls 55, 60, 65 begin to rotate, none of the raised sectorial steps 56, 61, 66 are in the roll opening 52, as shown in FIGURES 2 and 7. All of the pressure exerted by tag advance plate 48 upon tag stack 35 is borne by tag base plate 50 and slide rails 51, as illustrated with pressure vectors 75 in FIGURE 8.

Figure 3:
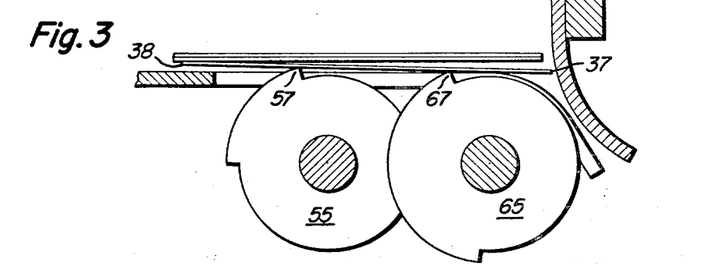
FIGURE 3 is the same view as FIGURE 2 except that the bottom tag, having been lifted along its rearward side by the compression roll, is slightly advanced toward the discharge slot while its forward side is about to be contacted by the discharge rolls.

As rolls 55, 60, 65 continue to rotate, leading edge 57 makes initial contact with bottom tag 36 and presses the rearward side of tag stack 35 away from base plate 50, as shown in FIGURE 3. Because the forward side of tag stack 35 is not compressed until leading edges 62, 67 rotate into contact therewith, the forward edge 37 is momentarily free to flap relatively loosely through a small angle. It is thus able to make contact, as rolls 55, 60, 65 continue to rotate, with curved discharge plate 22 at a slightly more acute angle which facilitates smooth sliding into discharge slot 25.

Figure 9:
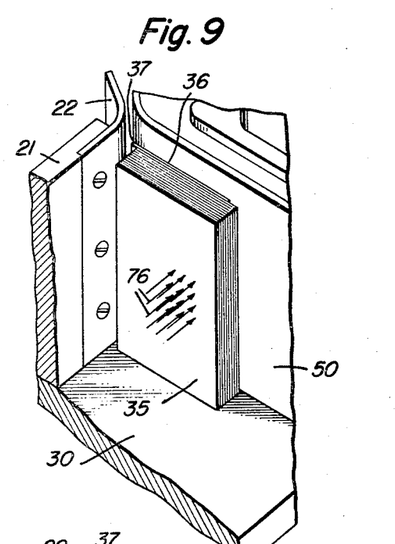
FIGURE 9 is the same view as FIGURE 8 except that the resisting forces are grouped opposite to the leading edge of the step of the compression roll, corresponding to FIGURE 3.

As leading edge 57 of compression roll 55 pushes against the rearward side of tag stack 35, pressure is exerted, presumably tangentially to the cylindrical surface of step 56, along this line of contact. This force can be resolved into a pushing component in a discharge plane perpendicular to front boundary wall 21 and a pressure component which is perpendicular to the pushing component. As rolls 55, 60, 65 rotate, bottom tag 36 slides toward, into, and through discharge slot 25, as urged by the pushing components of the force exerted by steps 56, 61, 66 of rolls 55, 60, 65 upon bottom tag 36. FIGURE 9 shows the pressure components in reverse, as perpendicular pressure vectors 76 exerted by tag advance plate 48 through the tags of tag stack 35 against leading edge 57.

Figure 4:
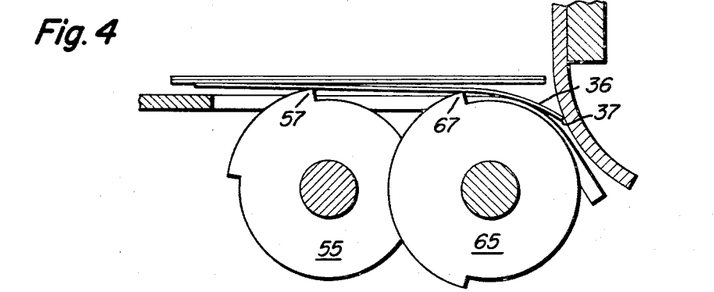
FIGURE 4 is the same view as FIGURE 3 except that the bottom tag has been lifted by both compression and discharge rolls and is being forced into the discharge slot, causing the forward side of the tag to be curved against the discharge plate as its forward edge slides against the opposite wall of the discharge slot.
Figure 5:
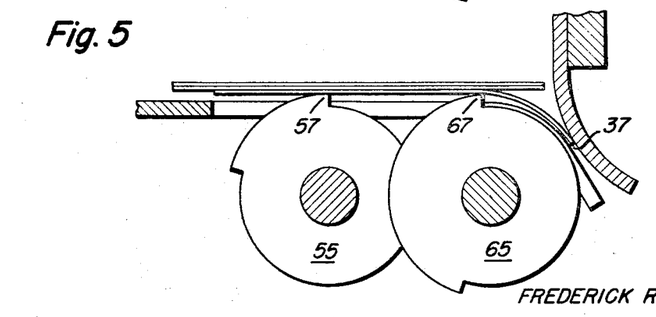
FIGURE 5 is the same view as FIGURE 4 except that the bottom tag has been shoved a little farther through the discharge slot.
Figure 10:
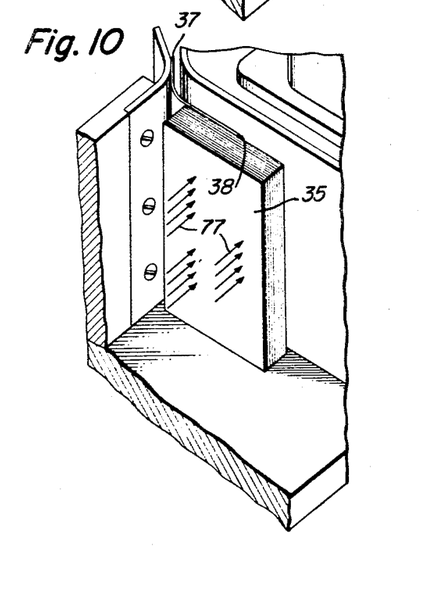
FIGURE 10 is the same view as FIGURE 9 except that the resisting forces are grouped opposite to the leading step edges of all three rolls, corresponding to FIGURES 4 and 5.

Additional rotation of rolls 55, 60, 65 brings raised step edges 62, 67 of discharge rolls 60, 65 into contact with bottom tag 36. This contact should occur at the same time as or just after initial contact of forward tag edge 37 with discharge plate 22. Bottom tag 36 is bent slightly upward, as shown in FIGURE 4, and pressed against tag stack 35 as step edges 62, 67 share with step 56 the compressive force exerted by cylinder 46 through plate 48. The compressive pressure pattern is shown in FIGURE 10 by pressure vectors 77 which are all grouped opposite to the lines of contact of sectorial steps 56, 61, 66 with bottom tag 36. Tag 36 is well into discharge slot 25. A side view corresponding to FIGURE 10 is shown in FIGURE 5.

Figure 11:
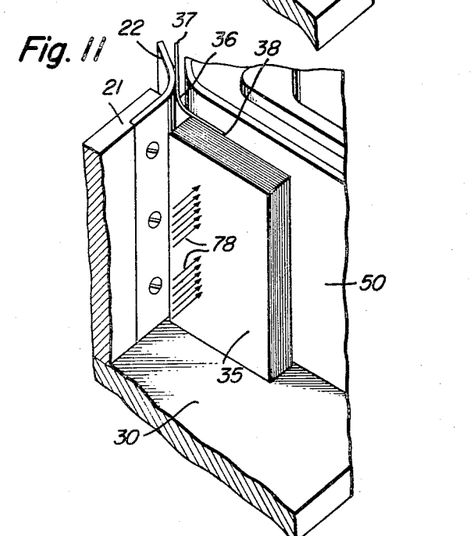
FIGURE 11 is the same view as FIGURE 10 except that all resisting forces are grouped opposite to the step surfaces of the discharge rolls, corresponding to FIGURE 6.

Additional rotation brings trailing edge 58 of compression roll 55 past the surface of base plate 50 so that sectorial step 56 is entirely out of contact with bottom tag 36. A side view is shown in FIGURE 6, and the resulting pressure pattern, as tag 36 emerges from discharge slot 25, is shown in FIGURE 11 where pressure vectors 78 are grouped opposite the lines of tangential contact between bottom tag 36 and steps 61, 66.

The final stage is shown in FIGURE 7 wherein only the relatively lengthy sectorial steps 61, 66 of secondary pickup rolls 60, 65 are in contact with tag 36 as it hangs from discharge slot 25. In this situation, tag 36 has become tag 36a, and a new bottom tag 36b is resting upon base plate 50. Forward edge 37a of tag 36a is close to engagement with the tag conveyor (not shown). When trailing edges 63, 68 of steps 61, 66 have rotated past the ends 52 of slide rails 51 and when rearward edge 38a has slid off these ends 52, all rotation of rolls 55, 60, 65 ceases, and the rolls remain at rest until a demand signal is again received by the drive means, as from a detection device on a bag conveyor line, such as an electric eye, a microswitch or similar detection devices.

Circumferential length of the sectorial steps 61, 66 of discharge rolls 60, 65, from leading edges 62, 67 to trailing edges 63, 68, respectively, should be sufficient to carry rearward edge 38a of discharging tag 36a past ends 52 of slide rails 51 and can be calculated by expressing its arc in radians and multiplying by the radius of the sectorial steps 61, 66.

Circumferential length of sectorial step 56 of compression roll 55 must be much less than the circumferential length of sectorial steps 61, 66. It is desirable, however, that sectorial step 56 be long enough to assist in pushing leading edge 37 past the narrowest part of discharge slot 25. The arcuate distance from leading edge 57 to trailing edge 58 should be no more than the distance along bottom tag 36 from the line of initial contact by leading edge 57 to rearward edge 38 of bottom tag 36 and equals its arc in radians multiplied by the radius of sectorial step 56; a greater length would begin movement of the next bottom card 36b.

The angular lead, in radians, of leading edge 57 of compression roll 55 relative to leading edges 62, 67 of discharge rolls 60, 65 should be equal to the linear distance from forward edge 37 to the line of contact with discharge plate 22, divided by the radius of sectorial step 56.

The tag feeder is preferably operated on a demand-and-serve basis with a stop-and-go type of drive means, but it can be successfully operated with a continuous type of drive means, particularly if a variable-speed motor 85, attached to roll section 80, is combined with a bypass gate on the tag conveyor line which is actuated by a void detection device on the assembly line to dump unneeded tags onto a refill stack (not illustrated in the drawings).

Figure 8:
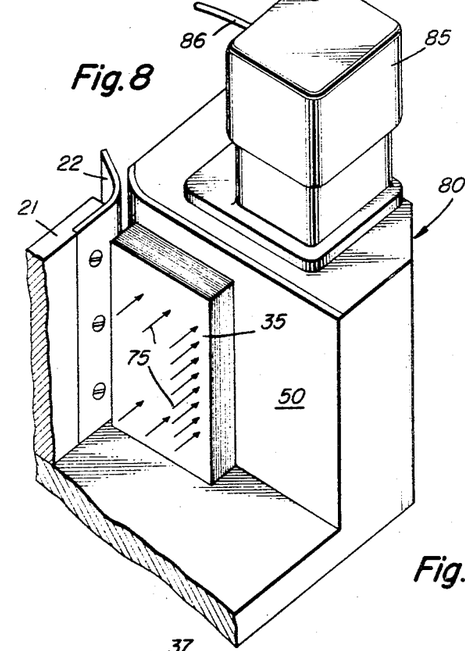
FIGURE 8 is a perspective view similar to FIGURE 1. It shows the tag feeder containing a stack of tags that are being acted upon by resisting forces, created by the tag advance plate, which outline the tag base plate.

The stop-and-go drive means can be any device capable of imparting single-turn rotation to the shafts 71, 72 with negligible start-up lag and terminal coasting. An electrically-braked motor 85, such as shown in FIGURES 8 and 13, is satisfactory, but a pneumatically powered lever-and-ratchet device, such as shown in FIGURE 1, is preferred for improved economy and safety.

Motor 85 is an electrically braked, single-revolution electrical motor which conveniently turns at 25 r.p.m. A drive gear 87 on motor shaft 86, having a 2:1 gear ratio, engages slave gear 73 on compression roll shaft 71 and slave gear 74 on discharge roll shaft 72 whereby both roll shafts 71, 72 are driven at 50 r.p.m., for example.

An example of a useful lever-and-ratchet device is air cylinder 82 that rotates lever arm 83, having a slotted connection therewith, through a 90° turn, as shown in FIGURE 1. A gear ratio of 4:1 turns shafts 71, 72 through one complete revolution. Forward rotation of motor shaft 86 is accomplished by friction wedge 84 acting against motor shaft 86. A quarter-turn pawl and ratchet is also useful, for example, with this gear ratio.

A printing device can be installed on the same discharge roll shaft 72 as secondary rolls 60, 65 to print one or more lines of identifying information across the end of the tag nearest to wall 30. The printing device comprises a type wheel 95 on discharge roll shaft 72 and an ink wheel 90 on an idler shaft 91 which is rotatably attached to wall 30. Ink wheel 90 is driven by friction from type wheel 95. The ink wheel 90 preferably is equipped with a microporous plastic cylinder 92 holding enough ink for about 150,000 marking impressions. The type wheel 95 has transverse annular washers 96, forming grooves 97 into which U-shaped prongs 99 of type 98 are inserted. Ink wheel 90 is idly and eccentrically mounted by means of eccentric bearing 93 so that contact pressure on type 98 can be selectively adjusted. Type 98 receives a fresh coating of ink from cylinder 92 with every rotation of shaft 72 and immediately transfers this ink to the tag 36 which is sliding over base plate 50.

The preferred embodiments shown in the drawings may be simplified in construction by:

(1) Using a flat boundary means for rigid front boundary wall 21, such as a pair of rigid metal rods in a flat boundary plane, (2) Replacing outwardly curved discharge plate 22 with a pair of similarly curved metal rods having linear elements of curvature in parallel with the flat boundary plane, (3) Attaching a pressure-applying means to the pair of rigid metal rods which replace front wall 21, whereby stiffener wall 30 and pressure wall 45 can be eliminated, (4) Replacing tag base plate 50 with a pair of flat tag supports which are rigidly attached to the pair of rigid metal rods so that the flat surfaces of these tag supports are in a common tag discharge plane that is perpendicular to the flat boundary plane, (5) Mounting discharge rolls 60, 65 between the tag supports so that: (a) only their raised steps 61, 66 protrude beyond the flat surfaces of the tag supports, (b) rotation of the rolls causes the sectorial steps 61, 66 to move toward the curved metal rods replacing curved discharge plate 22, and (c) additional rotation of the discharge rolls brings raised sectorial steps 61, 66 into circular convergence with the curved metal rods replacing curved discharge plate 22 while maintaining a spaced-apart relationship therewith that defines a discharge slot therebetween, whereby slide rails 51 and the covering portion of tag base plate 50 can be eliminated, and (6) Attaching a roll-mounting means, comprising metal braces, mounting brackets, and bearings, to the tag supports replacing tag base plate 50, whereby the box-like enclosure of roll section 80 can be eliminated.

This simplified construction is accessible for easy cleaning and is lighter in construction than the embodiments shown in the drawings but retains all essential features of the invention.

I claim:

1. A tag feeder for singly supplying a flexible tag, comprising:
    (a) a flat boundary means against which the forward side of a stack of flexible tags is aligned,
    (b) a curved discharge means, whose linear elements are parallel to the plane of the boundary means, that is rigidly attached to said flat boundary means,
    (c) a pair of tag supports that are rigidly attached to said flat boundary means, near to said curved discharge means but on the opposite side to the direction of curvature of the curved discharge means, said tag supports being mutually separated by a distance less than the length of a tag and each tag support having a flat surface in a common tag discharge plane that is in right-angled relationship to said flat boundary means and slightly beyond the beginning of curvature of said curved discharge means, whereby the ends of the stack of tags rests upon the flat surfaces,
    (d) pressure-applying means for compressing the stack of tags against said flat surfaces of the tag supports, said pressure-applying means being rigidly parallel to the tag discharge plane,
    (e) roll support means that are attached to said tag supports on the opposite side thereof from said flat surfaces,
    (f) a two-stage tag selection means, comprising:
        (1) a discharge roll, having a peripheral surface which is formed of two distinct sectorial steps of differing radii, that is rotatably attached to said roll support means and so mounted between said tag supports:
            (a) as to permit only the step having the larger radius to protrude beyond the flat surfaces of the tag supports,
            (b) that rotation of the roll causes the protruding sectorial step to move toward said curved discharge means, and
            (c) additional rotation of the discharge roll brings the protruding sectorial step into circular convergence with the curved discharge means while maintaining a spaced-apart relationship that defines a discharge slot therebetween, and (2) a compression roll, having a peripheral surface which is formed of two distinct sectorial steps of differing radii, that is rotatably attached to said roll support means at a greater distance from said curved discharge means than said discharge roll and so mounted between said tag supports as to permit only the step having the larger radius to protrude beyond said flat surfaces of the tag supports, whereby the compression roll initially compresses the stack of tags on the rearward side thereof, thus loosening the stack of tags on the forward side thereof, and the discharge roll secondarily compresses the stack of tags on the forward side thereof at the same time as, or slightly after, the forward edge of the tag adjacent to the tag discharge plane strikes the curved discharge means, (g) drive means that are attached to said roll support means, (h) gear means that are connected to said drive means and to the discharge roll and the compression roll, whereby all of said rolls rotate simultaneously in the same direction and at the same rotational speed.

2. The tag feeder of claim 1 in combination with a tag conveying means, whereby a tag which is supplied by the tag feeder is delivered to an assembly line, said tag conveying means having a bypass gate that dumps unneeded tags onto a refill stack when actuated by a void detection device on the assembly line.

3. The tag feeder of claim 1 wherein the drive means have single-turn rotational capability and are actuated by a demand signal.

4. The tag feeder of claim 3 wherein the drive means are an electrically braked, single-revolution electric motor.

5. The tag feeder of claim 3 wherein the drive means are a pneumatically powered lever-and-rachet device.

6. The tag feeder of claim 1 wherein printing means, for selectively printing across one end of the tag adjacent to the tag discharge plane, are rotatably attached to the roll support means.

7. The printing means of claim 6 which comprise:
(a) a type wheel, having selectively inserted type in its periphery, that is rigidly attached to the discharge roll, and
(b) an ink wheel that is rotatably attached to the roll support means and in peripheral contact with the type wheel, and
(c) means for selectively adjusting the contact pressure between the type wheel and the ink wheel, whereby printing ink is transferred from the ink wheel to the type on the type wheel and thence to an end of the tag adjacent to the tag discharge plane.

8. A tag feeder for singly supplying a flexible tag in response to a demand signal therefor, comprising:
(a) a tag storage section within which a supply of stacked tags is stored, comprising:
(1) a boundary wall, against which the forward side of stack of flexible tags is aligned, that terminates along one edge in an outwardly curved discharge plate,
(2) an elongated stiffener wall that is rigidly attached perpendicularly to the boundary wall,
(3) a pressure wall that is rigidly attached to the boundary wall, on the edge thereof that is opposite to the outwardly curved discharge plate, and to the stiffener wall,
(4) a tag base plate that is rigidly attached perpendicularly to the stiffener wall and that is aligned parallel to the pressure wall and perpendicularly to the boundary wall, slightly beyond the beginning of curvature of said curved discharge plate, whereby the boundary wall, the stiffener wall, the pressure wall, and the tag base plate enclose four sides of the tag storage section, said tag base plate having:
(a) a central roll opening therein that extends to the edge which is adjacent to the curved discharge plate,
(b) a slide rail on each side of the central opening, each slide rail having a flat tag-supporting surface upon which rests one end of said stack of tags, and
(c) two curved discharge surfaces, each contiguous with one of said slide rails, that circularly converge into parallel alignment with the curved discharge plate while maintaining a spaced-apart relationship that defines a discharge slot therebetween,
(5) a pressure-applying means that is attached to said stiffener wall and is capable of applying pressure toward said tag base plate, and
(6) a rigid tag advance plate that is rigidly attached to said pressure-applying means and is aligned parallel to said tag base plate, and (b) a roll section that is adjacent to the tag base plate, on the opposite side thereof from the tag-supporting surfaces of the slide rails, and has the extended stiffener wall as one side thereof, comprising:
(1) a motor wall that is rigidly attached to the tag base plate, on the opposite side thereof from said stiffener wall,
(2) a discharge roll shaft that is rotatably attached to said stiffener wall and said motor wall,
(3) a pair of discharge rolls, each roll having a peripheral surface which is formed of two distinct sectorial steps of differing radii, that are rigidly and axially attached to said discharge roll shaft so that they are centered within said central opening, the discharge roll shaft being located so that only the sectorial steps having the larger radius protrudes beyond said flat tag-supporting surfaces and said curved discharge surfaces,
(4) a compression roll shaft that is rotatably attached to the extended stiffener wall and to the motor wall,
(5) a compression roll, having a peripheral surface which is formed of two distinct steps of differing radii, that is rigidly attached to said compression roll shaft so that the compression roll is straddled and partially overlapped by said discharge rolls, the compression roll shaft being located so that only the sectorial step having the larger radius protrudes beyond said flat tag-supporting surface,
(6) drive means of single-turn rotational capability,
(7) gear means that are connected to said drive means and to the discharge roll shaft and the compression roll shaft, whereby all of said rolls rotate simultaneously and at the same rotational speed, and
(8) means for actuating said drive means to initiate each single turn thereof.

9. The tag feeder of claim 8 wherein the drive means are a pneumatically powered lever-and-ratchet device and the tag feeder is operated in combination with a tag conveyor.

10. The tag feeder of claim 9 wherein printing means, for selectively printing across one end of the tag adjacent to the tag discharge plane, are mounted, comprising:
(a) a type wheel, having selectively inserted type in the periphery thereof, that is rigidly attached to the discharge roll shaft,
(b) an ink wheel, having a microporous plastic cylinder in the periphery thereof, that is rotatably attached to said motor wall, and (c) means for selectively adjusting the contact pressure between the type wheel and the ink wheel, whereby ink is transferred from said microporous plastic cylinder to said type on the type wheel to one end of the tag adjacent to the slide rails as said tag is moved over the slide rails into contact with the curved discharge plate and through the discharge slot.

References Cited

UNITED STATES PATENTS

| 302,208 | 7/1884 | Munson et al. | 27—41 |
| 1,971,962 | 8/1934 | Jones | 271—41 |
| 2,394,410 | 2/1946 | Tascher | 271—41 |

ROBERT E. PULFREY, *Primary Examiner.*

J. R. FISHER, *Assistant Examiner.*